(12) United States Patent  
Georgiev

(10) Patent No.: US 7,872,796 B2
(45) Date of Patent: Jan. 18, 2011

(54) LIGHT FIELD MICROSCOPE WITH LENSLET ARRAY

(75) Inventor: Todor G. Georgiev, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 966 days.

(21) Appl. No.: 11/627,141

(22) Filed: Jan. 25, 2007

(65) Prior Publication Data

US 2008/0180792 A1 Jul. 31, 2008

(51) Int. Cl.
*G02B 21/00* (2006.01)
(52) U.S. Cl. .................................... 359/368; 359/619
(58) Field of Classification Search ................ None
See application file for complete search history.

(56) References Cited

U.S. PATENT DOCUMENTS

| | | | |
|---|---|---|---|
| 725,567 A | 4/1903 | Ives | |
| 2,039,648 A | 5/1936 | Ives | |
| 3,985,419 A | 10/1976 | Matsumoto et al. | |
| 4,180,313 A | 12/1979 | Inuiya | |
| 4,193,093 A | 3/1980 | St. Clair | |
| 4,849,782 A | 7/1989 | Koyama et al. | |
| 5,076,687 A | 12/1991 | Adelson | |
| 5,361,127 A | 11/1994 | Daily | |
| 5,400,093 A | 3/1995 | Timmers | |
| 5,659,420 A * | 8/1997 | Wakai et al. ................. | 359/368 |
| 5,729,011 A | 3/1998 | Sekiguchi | |
| 5,946,077 A | 8/1999 | Nemirovskiy | |
| 6,137,937 A | 10/2000 | Okano et al. | |
| 6,268,846 B1 | 7/2001 | Georgiev | |
| 6,301,416 B1 | 10/2001 | Okano et al. | |

(Continued)

FOREIGN PATENT DOCUMENTS

EP 1548481 6/2005

(Continued)

OTHER PUBLICATIONS

T. Georgiev, K. C. Zheng, B. Curless, D. Salesin, S. Nayar, C. Intwala, 'Spatio-angular resolution tradeoff in integral photography', Proc. EGSR, 2006.*

(Continued)

*Primary Examiner*—Arnel C Lavarias
(74) *Attorney, Agent, or Firm*—Robert C. Kowert; Meyertons, Hood, Kivlin, Kowert & Goetzel, P.C.

(57) ABSTRACT

A light field microscope incorporating a lenslet array at or near the rear aperture of the objective lens. The microscope objective lens may be supplemented with an array of low power lenslets which may be located at or near the rear aperture of the objective lens, and which slightly modify the objective lens. The result is a new type of objective lens, or an addition to existing objective lenses. The lenslet array may include, for example, 9 to 100 lenslets (small, low-power lenses with long focal lengths) that generate a corresponding number of real images. Each lenslet creates a real image on the image plane, and each image corresponds to a different viewpoint or direction of the specimen. Angular information is recorded in relations or differences among the captured real images. To retrieve this angular information, one or more of various dense correspondence techniques may be used.

34 Claims, 9 Drawing Sheets

U.S. PATENT DOCUMENTS

| | | |
|---|---|---|
| 6,339,506 B1 | 1/2002 | Wakelin et al. |
| 6,351,269 B1 | 2/2002 | Georgiev |
| 6,476,805 B1 | 11/2002 | Shum et al. |
| 6,738,533 B1 | 5/2004 | Shum et al. |
| 6,838,650 B1 * | 1/2005 | Toh .................... 250/201.3 |
| 7,054,067 B2 | 5/2006 | Okano et al. |
| 7,620,309 B2 | 11/2009 | Georgiev |
| 2001/0012149 A1 | 8/2001 | Lin et al. |
| 2001/0050813 A1 | 12/2001 | Allio |
| 2002/0140835 A1 | 10/2002 | Silverstein |
| 2004/0114807 A1 | 6/2004 | Lelescu et al. |
| 2004/0223214 A1 | 11/2004 | Atkinson |
| 2005/0088714 A1 | 4/2005 | Kremen |
| 2009/0041381 A1 | 2/2009 | Georgiev |
| 2009/0041448 A1 | 2/2009 | Georgiev |

FOREIGN PATENT DOCUMENTS

| | | |
|---|---|---|
| WO | 01/37025 | 5/2001 |
| WO | 2006/057838 | 6/2006 |
| WO | 2007/115281 | 10/2007 |

OTHER PUBLICATIONS

International Search Report for PCT/US2008/052036, mailed Jun. 23, 2008.

Levoy, Mark et al. "Light Field Microscopy", Stanford University, Submitted to Siggraph 2006.

Levoy, Mark, "Optical Recies for Light Microscopes", Stanford Computer Graphics Laboratory Technical Memo 2006-001, Jun. 20, 2006.

Ng, Ren et al., Light Field Photography with a Hand-held Plenoptic Camera, Stanford University, Stanford Tech Report CTSR 2005-02, Apr. 2005.

Park, S., Park, M., and Kang, M., "Super-resolution image reconstruction: a technical overview," Signal Processing Magazine, 2003, 16 pages.

David E. Roberts, History of Lenticular and Related Autostereoscopic Methods, 2003, 17 pages.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lumsdaine A., Georgiev T.: Full Resolution Lightfield Rendering. Tech. rep., Adobe Systems, Jan. 2008, 12 pages.

Baker S., Kanade T.: Limits on superresolution and how to break them. IEEE Transactions on Pattern Analysis and Machine Intelligence (Jan. 2002), 377 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, 1 (Jan. 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Georgiev T., Lumsdaine A.: Depth of field in plenoptic cameras. In Eurographics 2009—Annex (Apr. 2009), pp. 5-8.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

Adelson T., Wang J.: "Single Lens Stereo with a Plenoptic Camera," IEEE Transactions on Pattern Analysis and Machine Intelligence (1992), 99-106.

Brown M., Lowe D. G.: "Unsupervised 3d Object Recognition and Reconstruction in Unordered Datasets," in Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), 43-54.

Georgiev T., Wainer M.: "Morphing Between Multiple Images," Tech. Rep. (1997).

Isaksen A., McMillan L., Gortler S. J.: "Dynamically Reparameterized Light Fields," ACM Trans. Graph. (2000), 297-306.

Xiao J., Shah M.: "Tri-view Morphing," Computer Vision and Image Understanding 96, 3 (2004), 345-366.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Ng R.: "Fourier Slice Photography," Proceedings of ACM SIGGRAPH 2005 (Jan. 2005).

Naemura T., Yoshida T., Harashima H.: "3d Computer Graphics Based on Integral Photography," Optics Express, vol. 8, 2 (2001).

Zitnick C. L., Jojic N., Kang S.: "Consistent Segmentation for Optical Flow Estimation" in Proceedings of IEEE International Conference on Computer Vision (ICCV) (2005).

Seitz S. M., Dyer C. R.: "View Morphing," ACM Trans. Graph. (1996), 21-30.

Stevens R., Harvey T.: "Lens Arrays for a Three-dimensional Imaging System," Journal of Optics A, vol. 4 (2002).

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

Wilburn B., Joshi N., Vaish V., Talvala E., Antunez E., Barth A., Adams A., Levoy M., Horowitz M.: "High Performance Imaging Using Large Camera Arrays," in ACM Trans. Graph. (2005).

U.S. Appl. No. 12/574,183, filed Oct. 6, 2009.
U.S. Appl. No. 12/144,411, filed Jun. 23, 2008.
U.S. Appl. No. 12/186,396, filed Jun. 23, 2008.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/503,803, filed Jul. 15, 2009.
U.S. Appl. No. 12/628,437, filed Dec. 1, 2009.
U.S. Appl. No. 12/790,677, filed May 28, 2010.

Yang, J C, et al., "A Real-Time Distributed Light Field Camera," Rendering Techniques 2002, Eurographics Workshop Proceedings, PIS, Italy, Jun. 26-28, 2002, 9 pages.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, 12 pages, XP002491494.

M. Levoy, "Light Fields and computational Imaging," Computer [Online], vol. 39, No. 8, Aug. 2006, pp. 46-55, XP002501300.

Levoy M., Hanrahan P.: "Light Field Rendering," ACM Trans. Graph. (1996), 31-42.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, 13 pages.

J. Neumann, et al., "Eyes from Eyes Analysis of Camera Design Using Plenoptic Video Geometry," Dec. 2001, 20 pages, XP002509893.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Elad, M., and Feuer, A., "Restoration of a single superresolution image from several blurred, noisy, and undersampled measured images," IEEE Transactions on Image Processing Dec. 1997, pp. 1646-1658.

Farsiu, S., Robinson, D., Elad, M., and Milanfar, P., "Advances and challenges in super-resolution," International Journal of Imaging Systems and Technology, 2004, 12 pages.

* cited by examiner ns of thousands of microlenses 112 at the intermediate image plane 120, at or about 2.5 millimeters (mm) in front of the sensor (e.g., a charge coupled device (CCD)). This microlens array transposes the light field, producing an array of, for example, 55,000 small images of the rear aperture of the objective lens 100. The images capture the directional (angular) information of the light field, while each microlens location corresponds to spatial information. In this way, the 3D light field is multiplexed onto the 2D surface of the sensor.

LIGHT FIELD MICROSCOPE WITH LENSLET ARRAY

BACKGROUND

1. Field of the Invention

This invention relates to microscopy, and more specifically to three-dimensional light field microscopy.

2. Description of the Related Art

FIG. 1 illustrates a prior art light field microscope that may be used for real time three-dimensional (3D) microscopy. The light field microscope is based on a conventional microscope, modified by inserting a microlens array 110 containing tens or hundreds of thousands of microlenses 112 at the intermediate image plane 120, at or about 2.5 millimeters (mm) in front of the sensor (e.g., a charge coupled device (CCD)). This microlens array transposes the light field, producing an array of, for example, 55,000 small images of the rear aperture of the objective lens 100. The images capture the directional (angular) information of the light field, while each microlens location corresponds to spatial information. In this way, the 3D light field is multiplexed onto the 2D surface of the sensor.

The microlens array 110 of FIG. 1, for example, may produce 55,000 angular images captured by the sensor at image plane 120. Each image on the sensor may be, for example 14×14 pixels, or 10×10 pixels, depending on the size of the image and the pixel spacing of the sensor. Each of the pixels in an image corresponds to one location on the objective lens. Thus, the images record information in a mixed (angular) format. Each angular image is not a complete image, and each image taken by itself is meaningless and not particularly useful. To recover the information from the images, assume that each image has a coordinate system (of pixels in the image) based on an x and y axis—e.g., 10×10. Each pixel (i,j) is taken from each image and combined. This set of pixels (i,j) from each image, when combined, will form one image, a real image of what the microscope sees. This extraction and combination is performed for each pixel in the coordinate system to produce a set of (x*y) real images (or less, as some of the pixel locations in the coordinate system, for example pixels in overlapping boundaries, may have to be discarded).

Computer-implemented software techniques, which may be equivalent or similar to those used in conventional light field rendering, tomography, and confocal microscopy, may be used to process the captured images. The software may generate 3D views, and may extract other 3D information about the observed specimen 130.

Conventional microscopes typically allow the user to select among several objectives 100 by rotating a mechanical turret. The light field microscope illustrated in FIG. 1 may be implemented via a second turret filled with microlens arrays 110 matching F/numbers of the objectives 100. This additional mechanical part adds considerable complexity to the microscope and operation thereof. Further, the microlens array 110 may need to be positioned, for example, 2.5 mm from the sensor, with precision of better than 0.1 mm regarding shifts parallel to the image plane 120. Switching from one microlens array 110 to another with the above precision and in a robust way is extremely difficult as a mechanical problem, adding to the expense of the second turret.

Each microlens array 110 may include, for example, 50,000 to 100,000 microlenses, with each microlens having a diameter of, for example, 125 microns. Such an array of microlenses is expensive and difficult to manufacture. In addition, correction for aberration would be extremely difficult, considering the size and the number of microlenses that are used.

Each microimage captures the circular aperture of the objective, and contains partially illuminated pixels at the edge of the aperture which have uncertain pixel value, and thus may have to be discarded. Further, adjacent microimages may overlap by one or two pixels, and the overlapping pixels may have to be discarded. In addition, there may be many unused pixels on the sensor not illuminated by a microlens. Thus, as much as 50%, or more, of the sensor's pixels may be wasted.

Each microimage is very small. For example, the microlens array may generate 100,000 images, with each image occupying a 10×10 pixel grid on the sensor. For the at least one of the reasons stated above, the image processing software may have to remove a 2-pixel wide border or boundary from each microimage. Thus, out of 10×10 image, only 8×8 is useful. 64 pixels is significantly less than 100 pixels. Further, the smaller the image size, the higher a percentage of pixels will be lost.

SUMMARY

Various embodiments of a method and apparatus for a light field microscope that may be used for real time three-dimensional (3D) microscopy that incorporates a lenslet array at or near the rear aperture of an objective lens are described. Embodiments may supplement the microscope objective lens with an array of low power lenslets which may be located at or near the rear aperture of the objective lens, and which slightly modify the objective lens. The result is a new type of objective lens, or an addition to existing objective lenses.

In embodiments, a lenslet array is placed at or near to the objective lens. The lenslet array may include, for example, 9 to 100 lenslets (small, low-power lenses) that generate a corresponding number of real images. Each lenslet creates a real image on the image plane, and each image corresponds to a different viewpoint or direction of the specimen. Thus, embodiments of a light field microscope incorporating a lenslet array as described herein create real images as opposed to the angular images produced by a light field microscope with a microlens array located adjacent to the sensor. The real images capture the angular information differently than the light field microscope with a microlens array located adjacent to the sensor. Using a lenslet array at or near the objective lens, the same angular information is recorded in relations or differences among the much smaller number of captured real images. The relationship between any two of the images records the angular, 3D information for the images.

To retrieve this angular information, one or more of various dense correspondence techniques, which may also be referred to as image registration techniques, may be used to establish correspondence between and among the features on the real images produced by the lenslet array on and captured by the sensor. After establishing dense correspondence using known techniques, the images may be further processed using one or more of various software techniques.

In embodiments, the lenslet array may be located "after" the rear aperture of the objective lens. Since the space available for lenslets (defined by the diameter of the rear aperture of the objective lens) is typically approximately 10 millimeters (mm), if, for example, 10×10 images are desired, lenslets with a diameter of approximately 1 mm may be used. Larger lenses may be used to produce fewer images, or smaller lenses may be used to produce more images. The microscope objective lens is generally strong (high magnification) and thus has a short focal length f. In embodiments, the lenslets are weak (low magnification) and thus have a long focal length F. Note that F>f, so that the lenslets only slightly perturb the action of the objective lens.

The size of the lenses used in the lenslet array make it feasible to correct the lenses for aberrations. Locating the lenslet array at or near the objective lens avoids mechanical complications; for example, no additional high-precision turret to hold the lenslet array is required.

The light field produced by the lenslet array is not transposed. A light field microscope with the lenslet array captures, for example, 100 real images as opposed to, for example, 55,000 angular images captured by a microlens array located at the image plane. As a result, each image captured using the lenslet array is much larger than an individual image captured using a microlens array located at the image plane, which means that there are far fewer wasted boundary pixels as a percentage of the total number of pixels. Thus, the same sensor can be used to capture higher resolution images, with much less loss of pixels, than can be captured with a microscope using a microlens array located at the image plane.

A lenslet array can be placed almost anywhere after the microscope objective lens. In some embodiments, a lenslet array may be integrated with or coupled to an objective lens assembly. Alternatively, a lenslet array may be located at or near of the objective lens in the microscope assembly. In one embodiment, in an infinity corrected microscope, a lenslet array may be located at or near the tube lens, or alternatively the tube lens may be replaced with a lenslet array.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for a light field microscope that may be used for real time three-dimensional (3D) microscopy and that incorporates a lenslet array at or near the rear aperture of an objective lens are described. A microscope objective lens is of very strong power (and thus of small focal length), especially at high magnification. Quality microscope objective lenses are highly optimized, corrected for chromatic and other aberrations, planar and strongly specialized in different ways. The objective lens is the single most expensive component in a conventional microscope. Replacing the objective lens with an uncorrected array of lenslets may not be feasible. Thus, embodiments supplement the objective lens with an array of low power lenslets which may be located at or near the rear aperture of the objective lens, and which slightly modify the objective lens. The result is a new type of objective lens, or an addition to existing objective lenses. Embodiments may generate, for example, 100 real images of the specimen. These images capture the light field. After establishing dense correspondence using known techniques, the images may be processed using one or more of various software techniques.

Figure 1:
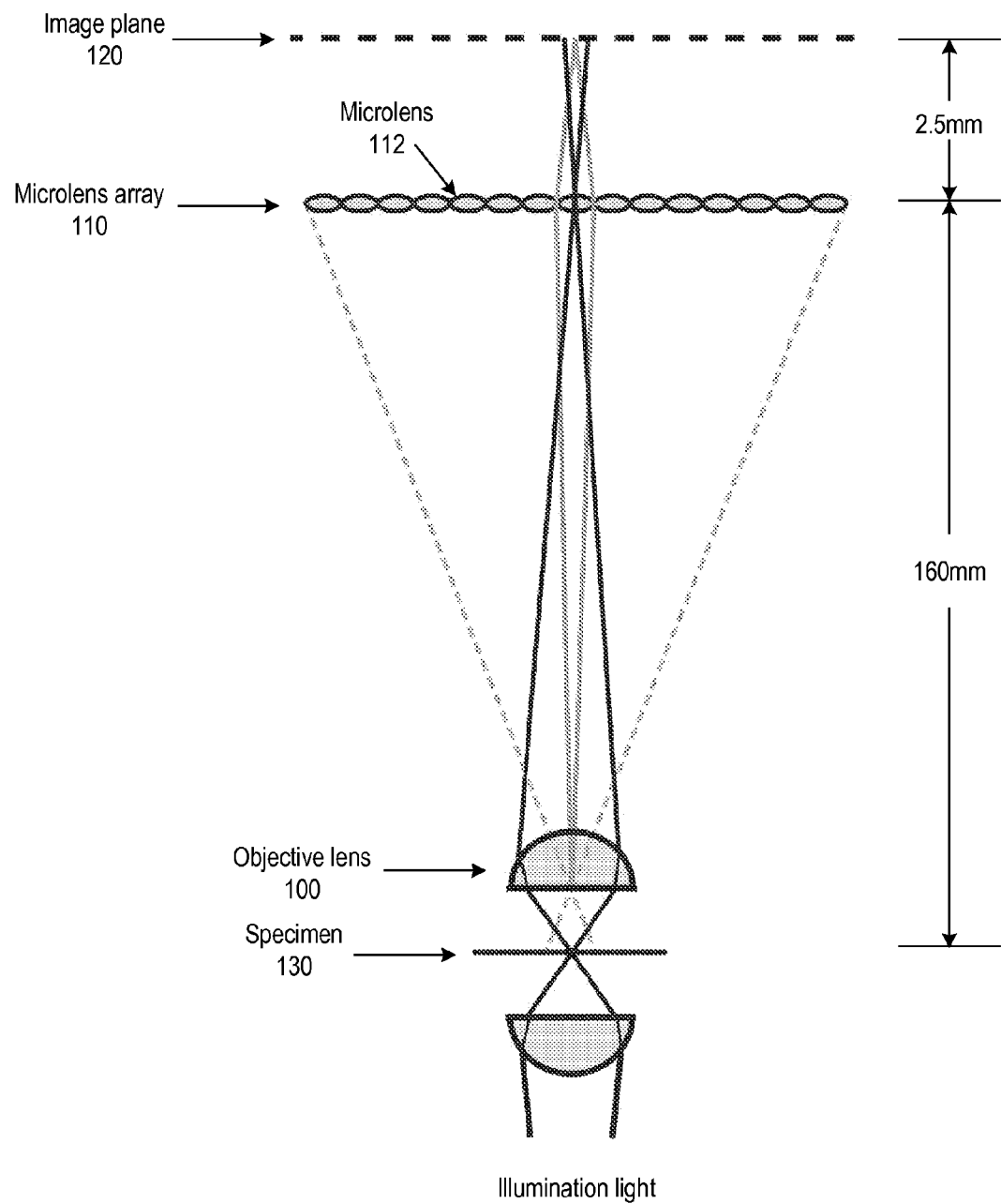
FIG. 1 illustrates a prior art light field microscope.

In embodiments, instead of placing a microlens array next to the sensor, as is done in the exemplary light field microscope illustrated in FIG. 1, a lenslet array is placed at or near to the objective lens. Instead of having 50 k-100 k microlenses that generate 50 k-100 k angular images, the lenslet array may include, for example, 9 to 100 lenslets (small, low-power lenses) that generate a corresponding number of real images. Each lenslet creates a real image, and each image corresponds to a different viewpoint or direction of the specimen. Thus, embodiments of a light field microscope incorporating a lenslet array as described herein create real images as opposed to the angular images produced by the light field microscope illustrated in FIG. 1. The real images capture the angular information differently than the angular images captured using a light field microscope with a microlens array located adjacent to the sensor as described in FIG. 1. Using embodiments of the lenslet array, the same angular information is recorded in relations or differences among the much smaller number of captured real images. The relationship between any two of the images records the angular, 3D information for the images.

A microscope objective lens typically has a small focal length f of, for example, 1 millimeter (mm) to 10 mm, depending on the power of the objective lens. For example, a typical 60× objective lens has a focal length f of approximately 3 mm. Generally, the higher the power of the objective lens, the shorter the focal length. In embodiments, the lenslet array is located "after" the rear aperture of the objective lens. Since the space available for lenslets (defined by the diameter of the rear aperture of the objective lens) is typically approximately 10 mm, if, for example, 10×10 images are desired, lenslets with a diameter of approximately 1 mm may be used. Larger lenses may be used to produce fewer images, or smaller lenses may be used to produce more images.

Note that the lenslet array may, but does not necessarily, include enough lenslets to "cover" the entire rear aperture of the objective lens. Since the lenslet array will include, at a theoretical minimum, at least two lenslets (in practice, a lenslet array will generally, but not necessarily, include at least nine lenslets), an absolute maximum diameter for the lenslets may be half the diameter of the rear aperture. In practice, the lenslets will generally be smaller than half the diameter of the rear aperture. The actual diameter of the lenslets, as stated, depends on the number of lenslets used in the lenslet array and the actual diameter of the rear aperture.

The microscope objective lens is generally strong (high magnification) and thus has a short focal length f. In embodiments, the lenslets are weaker lenses (low magnification lenses) and thus have a relatively longer focal length, represented herein by F. Note that F>f, and thus the lenslets may only slightly perturb the action of the original optimized objective lens.

Figure 2:
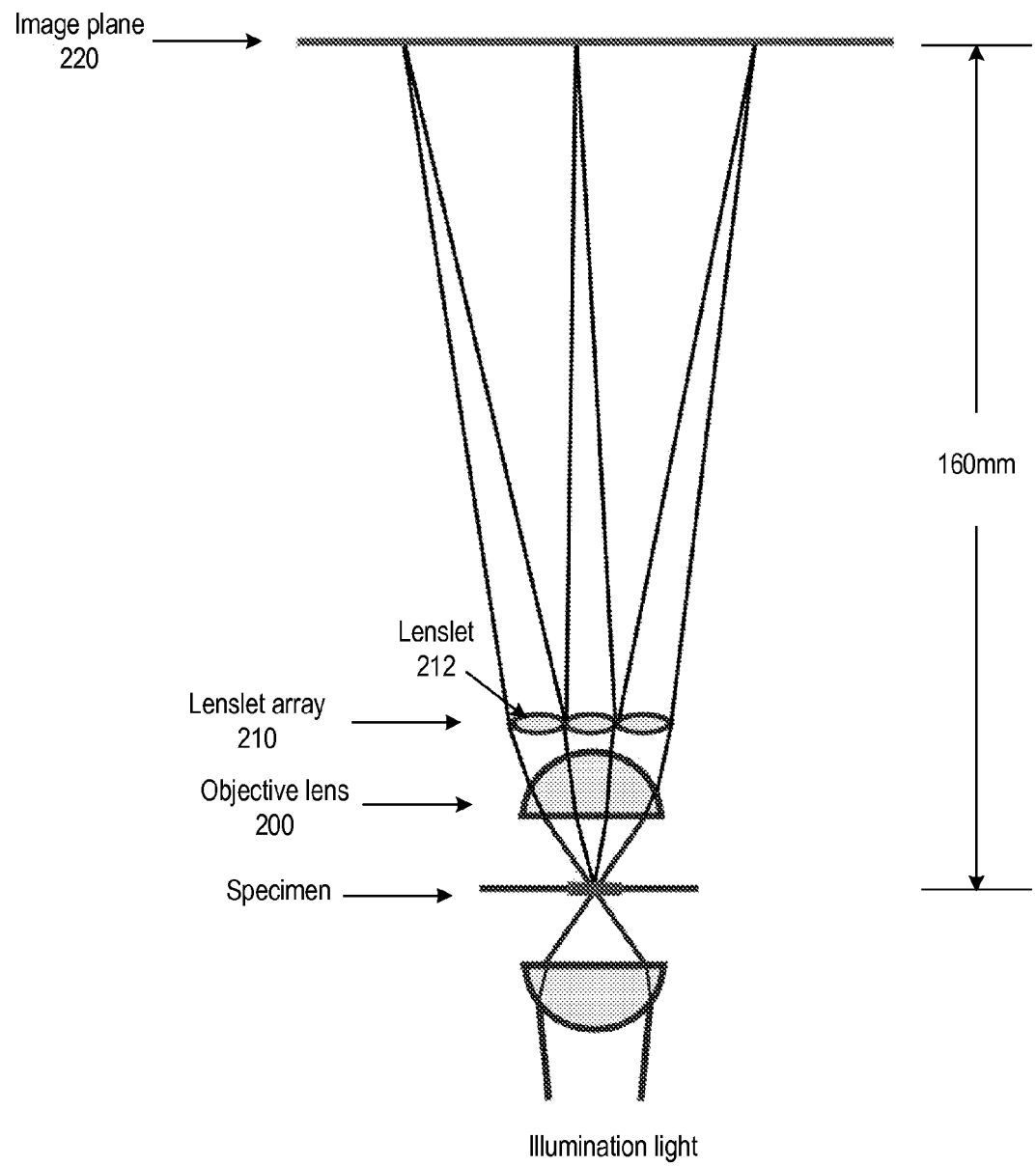
FIG. 2 illustrates a light field microscope incorporating a lenslet array at or near the objective lens according to one embodiment.

FIG. 2 illustrates a light field microscope incorporating a lenslet array at or near the objective lens that may be used to capture multiple real images that include light field information and that may thus be used for real time three-dimensional (3D) microscopy according to one embodiment. The light field microscope has an array of small lenses, or lenslets 212, referred to herein as a lenslet array 210, that may be integrated with, coupled to, or otherwise located at or near, the objective lens 200, rather than at or near the image plane as is done in the light field microscope illustrated in FIG. 1. Locating the lenslet array 210 at or near the objective lens 200 enables various embodiments to use larger and fewer, for example 500 times fewer, and more easily corrected, lenses in a smaller-size array when compared to the light field microscope with a microlens array including tens or hundreds of thousands of microlenses and located at or near the image plane as is illustrated in FIG. 1. For example, in one embodiment, an array of 10×10 lenslets 212, or 100 total lenslets 212, may be used, with each lenslet 212 having a diameter of, for example, 1 mm, as opposed to the approximately 0.1 mm diameter of the microlenses used in the microlens array depicted in FIG. 1. Note that different numbers of lenslets 212, and lenslets 212 with larger (or smaller) diameters, may be used in embodiments.

The larger lenses used in the lenslet array 210 make it more feasible to correct the lenses for aberrations, which is more difficult (and thus more expensive) or perhaps even impossible to do with lenses as small as those required by the microlens array of FIG. 1. Locating the lenslet array 210 at or near the objective lens 200 also avoids the mechanical complications of the light field microscope illustrated in FIG. 1. For example, no additional high-precision turret to hold the lenslet array 210 is required. Further, the lenslet array 210 creates higher resolution images than the microlens array of FIG. 1, and the individual images produced by the lenslets 212 of the lenslet array 210 may be corrected for aberrations. Thus, embodiments of the lenslet array 210 may be less expensive and may result in a higher quality optical system than the microlens array of FIG. 1.

The microlens array 110 of FIG. 1 transposes the light field. The light field produced by the lenslet array 210 is not transposed. A light field microscope with the lenslet array 210 captures, for example, 100 real images as opposed to, for example, 55,000 angular images captured by the microlens array 110 of FIG. 1. As a result, each image captured using the lenslet array 210 is much larger than the images captured using the microlens array 110 of FIG. 1, which means that there are far fewer wasted boundary pixels as a percentage of the total number of pixels. Thus, the same sensor can be used to capture higher resolution images with fewer lost pixels using a light field microscope incorporating a lenslet array 210 than can be captured with a light field microscope incorporating a microlens array 110 as illustrated in FIG. 1.

A lenslet array 210 can be placed almost anywhere after the objective lens 200. In some embodiments, a lenslet array 210 may be integrated with or coupled to an objective lens 200 assembly. Alternatively, a lenslet array 210 may be located at or near (e.g., within several millimeters) of the objective lens 200 in the microscope assembly. In one embodiment, in an infinity corrected microscope, a lenslet array 210 may be located at or near the tube lens, or alternatively the tube lens may be replaced with a lenslet array 210.

Figure 3:
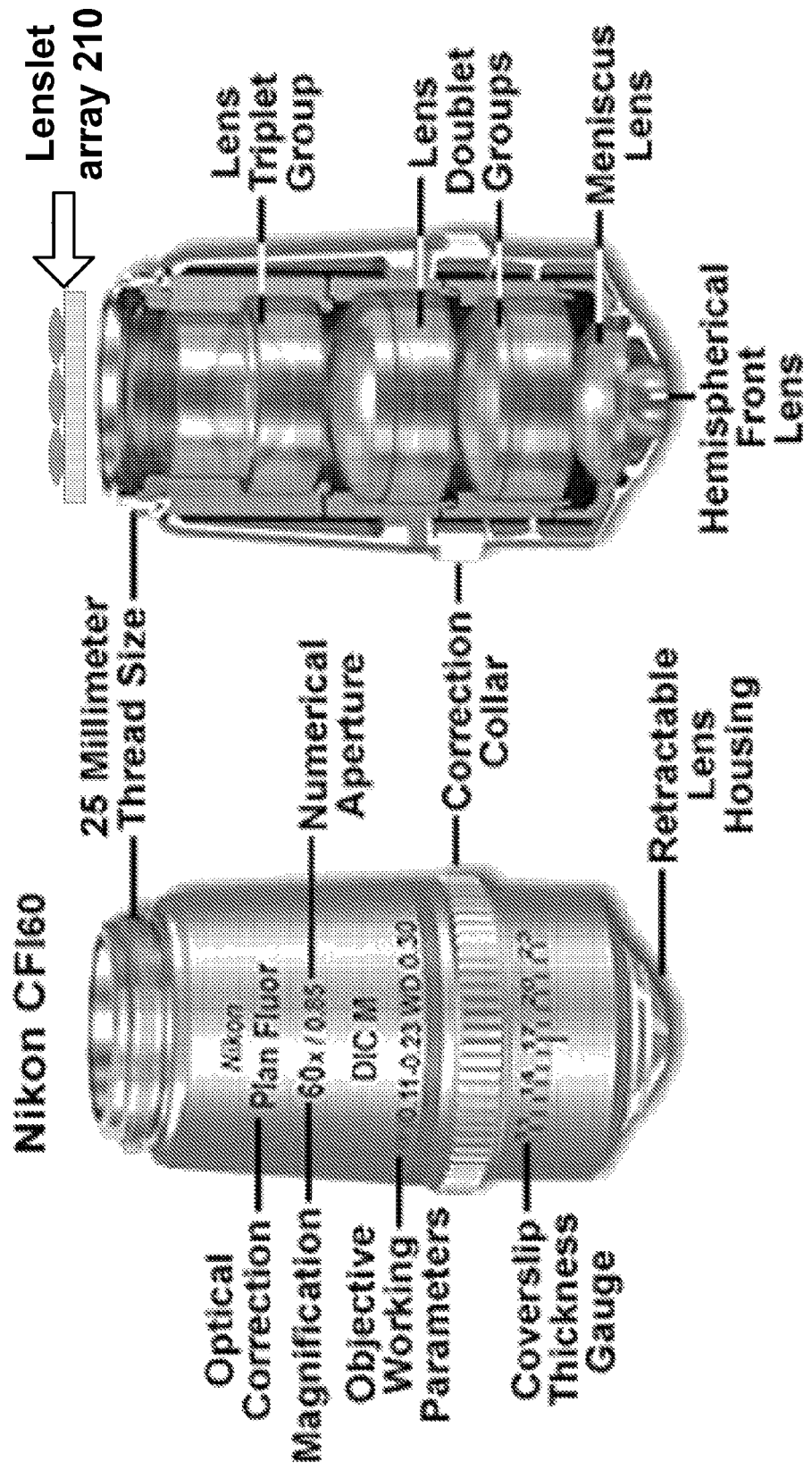
FIG. 3 illustrates an exemplary lenslet array located at or near the rear aperture of an exemplary microscope objective lens, according to one embodiment.
Figure 4:
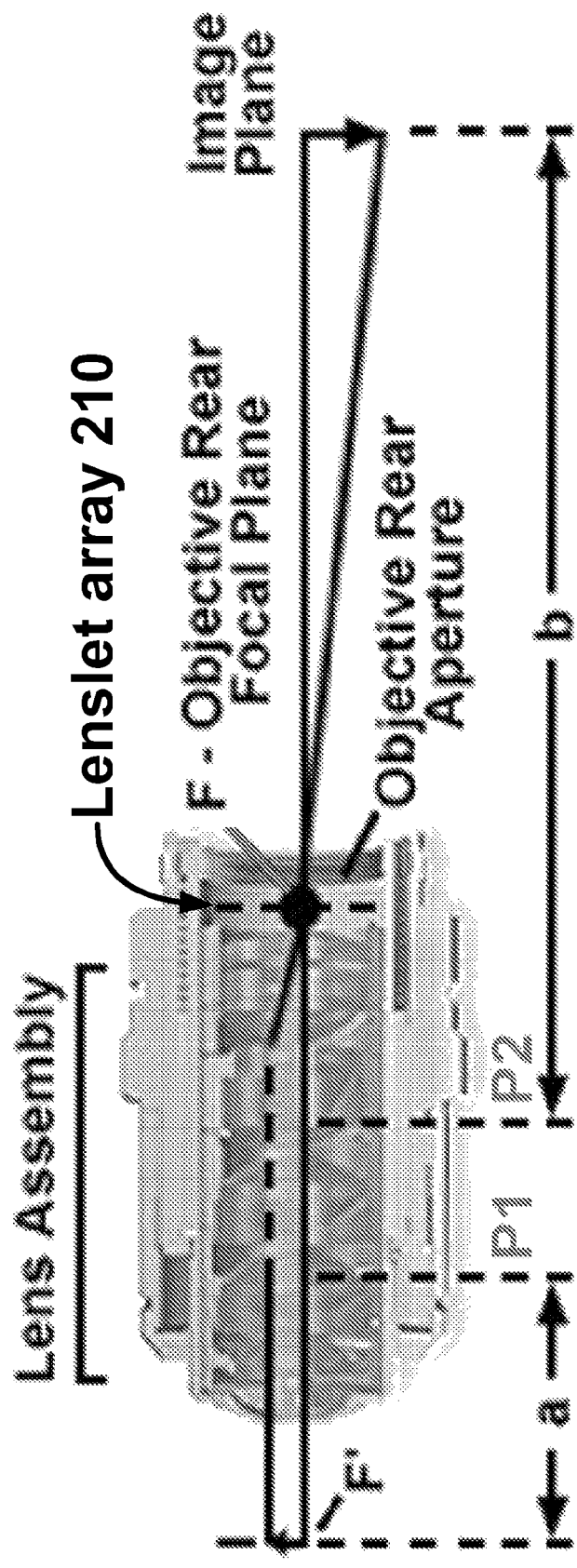
FIG. 4 illustrates an exemplary microscope objective lens with a lenslet array integrated with the objective lens assembly at or near the rear focal plane of the objective lens, according to one embodiment.

FIG. 3 illustrates an exemplary objective lens, a Nikon CF160 lens, and shows an exemplary lenslet array located at or near the rear aperture of the objective lens, according to one embodiment. FIG. 4 illustrates an exemplary microscope objective lens with an exemplary lenslet array 210 integrated with the objective lens assembly at or near the rear focal plane, according to one embodiment. FIG. 4 further illustrates the principal planes P1 and P2 of a lens assembly. A compound lens such as a microscope objective lens can be treated as a thin lens with the following modification. There are two planes called principal planes (referred to herein as P1 and P2), such that all incoming rays are calculated as if the lens is at the first principal plane P1, and all outgoing rays are computed as if the lens is at the second principal plane P2.

Referring to FIG. 4, assuming the lenslet array 210 is placed in the focal plane of the objective lens, each one of the lenslets 212 modifies the original compound objective lens by making the focal length slightly smaller by a factor m=1−f/F, and creates a new principal plane P3 which may be located just to the left of the second principal plane P2 in FIG. 4 (between P2 and P1) by a distance x=f*f/F. The derivation of these results is described below.

Figure 5:
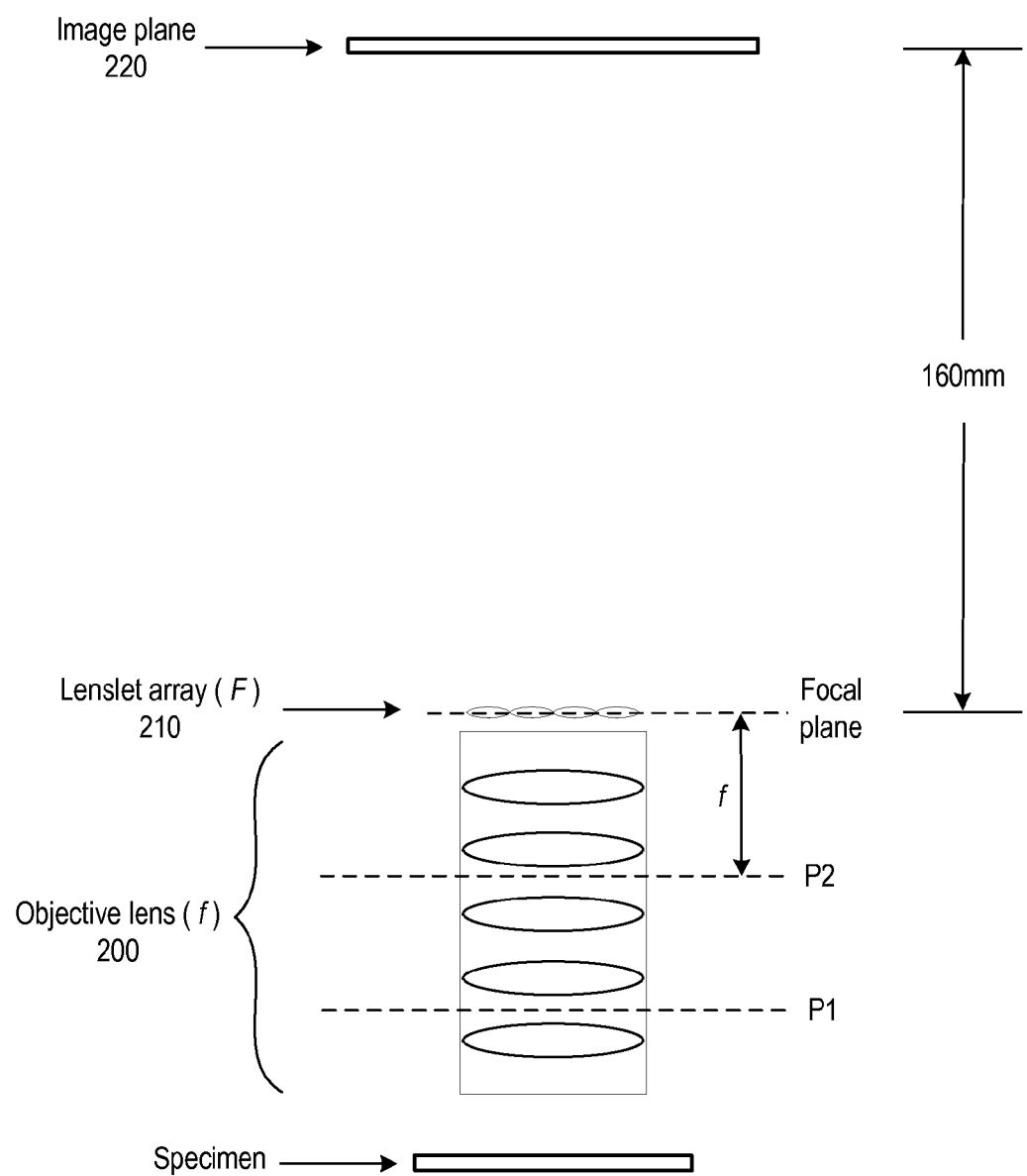
FIG. 5 is a diagram of an exemplary light field microscope with an exemplary lenslet array located at or near the focal plane of the objective lens, according to one embodiment.

FIG. 5 is a diagram of an exemplary light field microscope with an exemplary lenslet array located at or near the focal plane of the objective lens, according to one embodiment. The two principal planes of objective lens 200, P1 and P2, are shown. The objective lens 200 has a focal length f, and the lenslets 212 of lenslet array 210 have a focal length F. FIG. 5 may be referred to in the following calculations.

In optics, there are two types of transforms of the light field: (1) refraction by a lens and (2) traveling a given distance. These transforms may be described by corresponding matrices, and any optical device can be represented as a product of such matrices.

First, the total transformation matrix M for the light field from P2, to the rear focal plane of the objective lens. Then, to the other side of a lenslet placed in the focal plane, and then back by a distance t is derived, such that the transform is a lens transform (i.e. the top right matrix element is 0).

The lenslet is placed in the focal plane. The total transform M of the light field is the product of the (objective) lens transform (f), the distance translation (f), and the lenslet transform. In matrix form, the above is given by:

$$M = \begin{bmatrix} 1 & 0 \\ \frac{-1}{F} & 1 \end{bmatrix} \begin{bmatrix} 1 & f \\ 0 & 1 \end{bmatrix} \begin{bmatrix} 1 & 0 \\ \frac{-1}{f} & 1 \end{bmatrix}$$

Note that the leftmost matrix corresponds to the lenslet, the center matrix to the distance translation, and the rightmost matrix to the objective lens. Taking the product of the above matrices yields:

$$M = \begin{bmatrix} 0 & f \\ -\frac{1}{f} & 1-\frac{f}{F} \end{bmatrix}$$

Next, the magnitude of the translation (a shift relative to P2) to the new principal plane P3 is calculated:

$$\begin{bmatrix} 1 & t \\ 0 & 1 \end{bmatrix} \begin{bmatrix} 0 & f \\ -\frac{1}{f} & 1-\frac{f}{F} \end{bmatrix} = \begin{bmatrix} -\frac{t}{f} & f+t-\frac{tf}{F} \\ -\frac{1}{f} & 1-\frac{f}{F} \end{bmatrix}$$

Note that the upper right element in the resultant matrix needs to be 0 for the matrix to be a proper lens transform. In other words, the resultant matrix above needs to be:

$$\begin{bmatrix} -\frac{t}{f} & 0 \\ -\frac{1}{f} & 1-\frac{f}{F} \end{bmatrix}$$

To generate a proper lens transform from the resultant matrix shown above, the following is solved for t:

$$f + t\left(1-\frac{f}{F}\right) = 0$$

which yields:

$$t = -\frac{1}{\frac{1}{f}-\frac{1}{F}}$$

Note that t is negative because F>f (the lenslets are weaker lenses than the objective lens). The total shift from P2 that defines the new principal plane P3 is x=f+t. A Taylor series expansion may be used to find x:

$$x = f - \frac{1}{\frac{1}{f}-\frac{1}{F}} = f\left[1-\frac{1}{1-\frac{f}{F}}\right] = f\left[1-\left(1+\frac{f}{F}+\ldots\right)\right]$$

$$x = -f\left[\frac{f}{F}+\ldots\right]$$

where f/F is small (as F is considerably larger than f) and the ellipses ( . . . ) are higher-order corrections. Thus, the new principal plane P3 is shifted to the left of P2 (i.e., in the direction of P1). The final transform, after substituting for t, is:

$$\begin{bmatrix} \frac{1}{m} & 0 \\ -\frac{1}{f} & m \end{bmatrix}$$

where $$m = 1-\frac{f}{F}.$$

Note that:

$$\begin{bmatrix} \frac{1}{m} & 0 \\ -\frac{1}{f} & m \end{bmatrix} = \begin{bmatrix} \frac{1}{m} & 0 \\ 0 & m \end{bmatrix} \begin{bmatrix} 1 & 0 \\ -\frac{1}{mf} & 1 \end{bmatrix}$$

Thus, the final form of the transform is a combination of telescope (of small) magnification m, and a lens of focal length mf, where m=1−f/F. The image will be formed closer to the lens, first because the principal plane P2 is moved left (new principal plane P3), and second because the focal length is smaller. Note that the system is equivalent to a new objective lens located at the plane P3. The system consists of two elements, and is something like a telescope with magnification m plus a lens which has the power described by the righthand matrix shown above. Note that the righthand matrix describes a lens.

The system produces a small change to the focal length, represented by mf, where m=1−f/F. Note that m is close to 1, because F is much larger than f, and thus the change is relatively small. For example, if F is ten times bigger than f, the perturbation would be 1/10. The new lens (objective lens+ small power lenslet) behaves like the objective lens with modified properties; the principal plane is shifted to P3, and the focal length is changed by the factor mf.

Note that the above calculations apply to all the lenslets 212 in the lenslet array 210. Further note that the above calculations are not intended to be limiting, and that similar calculations may be performed for a lenslet array 210 located at other positions in the microscope assembly.

The optical property that a lens shifted from the optical axis is equivalent to a lens and a prism on the optical axis may be used in finding the focal length F for the lenslets 212. The property is represented by the formula:

$$\theta = \frac{s}{F}$$

where s represents the shift of the lens from the optical axis, and the angle of the prism is represented by θ. Assuming a sensor, for example a CCD, of the dimensions 35 mm×35 mm, and assuming that a lenslet array 210 including 10×10 lenslets 212 and thus used to create 10×10 images on the sensor, the distance (shift) between two images at the sensor is 3.5 mm. In a microscope, the distance from the objective lens to the image plane is typically 160 mm. This produces an angle of 0.022 for an image relative to the optical axis:

$$\theta = \frac{3.5\,\text{mm}}{160\,\text{mm}}$$
$$\theta = 0.022$$

If the lenslets 212 have a diameter of 1 mm, the lenslets are shifted from each other by 1 mm in the lenslet array 210, and therefore s=1 mm. Note that:

$$F = \frac{s}{\theta}$$

Substituting 1 mm for s and 0.022 for θ in the above yields F=45 mm for the lenslets. Thus, the correct results under the above assumptions should be produced by a lenslet of focal length F=45 mm, approximately. That it is a very weak lens, as is desired.

The F/number of a lens is defined as focal length/diameter. The lenses above have an F/number in the range of 45, which indicates a very weak and thus very easy to correct lens, with very small (and correctable) aberrations. Normal lenses have an F/number of about 4, and microscope objective lenses may have an F/number closer to 1, which is very difficult to correct. Thus, the lenslets do not introduce much if any aberration.

Note that the above calculations apply to all the lenslets 212 in the lenslet array 210. Further note that the above calculations are not intended to be limiting, and that similar calculations may be performed for a lenslet array 210 located at other positions in the microscope assembly and/or for lenslet arrays of different dimensions or that result in different shifts of the images. Different F/numbers may thus be generated, but note that the F/numbers will tend to be relatively large, and thus the lenslets required will tend to be relatively weak.

Note that there is a large degree of freedom as to where lenslet array 210 may be placed in the microscope. Placement of the lenslet array 210 is not to be limited by the calculations for an exemplary case of a lenslet array 210 located at the objective lens's rear focal plane as given above. Essentially, it does not matter exactly where in relation to the objective lens, within a reasonable range of a few millimeters, the lenslet array 210 is placed. If the lenslet array 210 is moved, the microscope can simply be refocused and the system will work. Note again the case of an infinity-corrected microscope, where a lenslet array 210 may be located at, or may even replace, the tube lens.

Figure 6A:
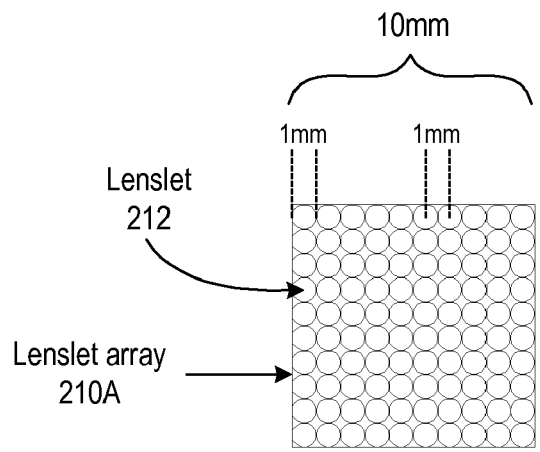
FIGS. 6A through 6C illustrate exemplary configurations of lenslet arrays according to various embodiments.
Figure 6B:
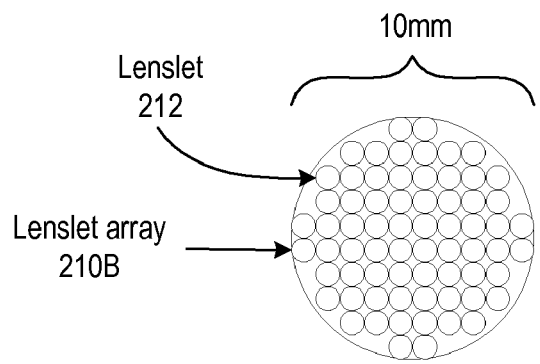
Figure 6C:
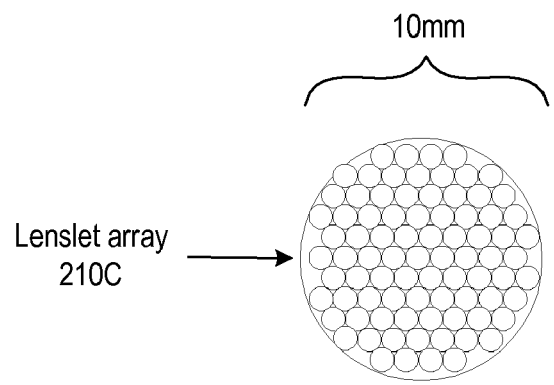

FIGS. 6A through 6C illustrate exemplary configurations of lenslet arrays 210 according to various embodiments. In FIG. 6A, exemplary lenslet array 210A is illustrated as a square grid of 10×10 lenslets 212. The grid is 10 mm on each side, so each lenslet 212 has a diameter of 1 mm, and the distance (shift) between the centers of the lenslets 212 is 1 mm. Note that the lenslets are not necessarily circles. Alternatively, lenslets may be cut or otherwise formed into a square shape (of side 1 mm), or into rectangles, hexagons, and so on. Other shapes of lenslets than circular may allow the lenslets to be more tightly packed; tighter packed lenslets may reduce the amount of light lost, and a near-perfect or perfect packing shape may nearly or completely eliminate the loss of light. Note that each lenslet 212 creates a real image, and each image corresponds to a different view or direction of the specimen. FIG. 6B illustrates an exemplary lenslet array 210B as a circular lenslet array of diameter 10 mm. Each lenslet 212 is of diameter 1 mm. Thus, there are only 68 lenslets 212 in lenslet array 210B. Again, note that each lenslet 212 creates a real image, and each image corresponds to a different view or direction of the specimen. FIG. 6C illustrates an exemplary lenslet array 210C as a circular lenslet array of diameter 10 mm. Each lenslet 212 is of diameter 1 mm. However, the lenslets 212 in lenslet array 21C are packed more closely together than those in the exemplary lenslet array 210B of FIG. 6B, there are more lenslets 212 (86) in lenslet array 210C than in lenslet array 210B. Again, note that each lenslet 212 creates a real image, and each image corresponds to a different view or direction of the specimen.

Note that the lenslet arrays 210 shown in FIGS. 6A through 6C are exemplary and are not intended to be limiting. Other configurations for lenslet arrays 210 are possible and contemplated, other sizes and shapes of lenslet arrays 210 are possible and contemplated, and other sizes, numbers, and arrangements of lenslets 212 in lenslet arrays 210 are possible and contemplated. Especially note that in some cases, the number of lenslets 212 may be fewer than 20, or more than 100.

Figure 7:
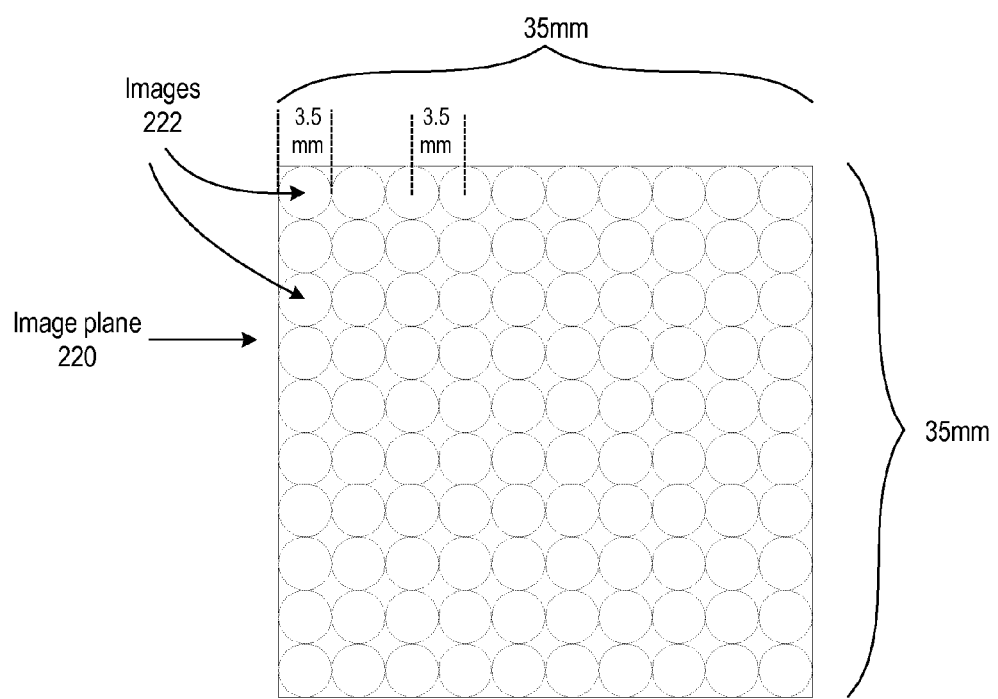
FIG. 7 illustrates an array of real images that may be produced by a lenslet array and captured via a sensor at the image plane of a light field microscope, according to one embodiment.

FIG. 7 illustrates an array of real images 222 that may be produced by an exemplary lenslet array 210 such as the exemplary lenslet array 210A in FIG. 6A and captured via a sensor (such as a CCD) at the image plane 220, according to one embodiment. In this example, a sensor of at least the dimensions 35 mm×35 mm is assumed. A lenslet array 210 including a 10×10 array of lenslets 212 is assumed, and is used to produce 100 real images of the specimen, each with a diameter of 3.5 mm, on the sensor. Note again that each lenslet 212 creates a real image 222, and each image corresponds to a different view or direction of the specimen. Thus, the images 222 capture angular information in the relationships or differences among the images. The number of pixels in each image 222 depends on the pixel spacing of the sensor. The shift between adjacent images is 3.5 mm.

Note that the sensor may capture the array of real images 222 as one image that includes all of the real images. Software may then be used to differentiate the real images 222 and to extract angular information from differences among the real images 222, for example via a dense correspondence technique.

Note that FIG. 7 is exemplary and is not intended to be limiting. Sensors of different dimensions may be used, and lenslet arrays 210 of different dimensions may be used to produce different numbers and/or sizes of images on the sensor. Further, the shift between adjacent images may be different, and is not necessarily equal to the diameter of the images themselves (e.g., there may be overlap between images or there may be additional space between images).

Processing of Captured Images

Figure 8:
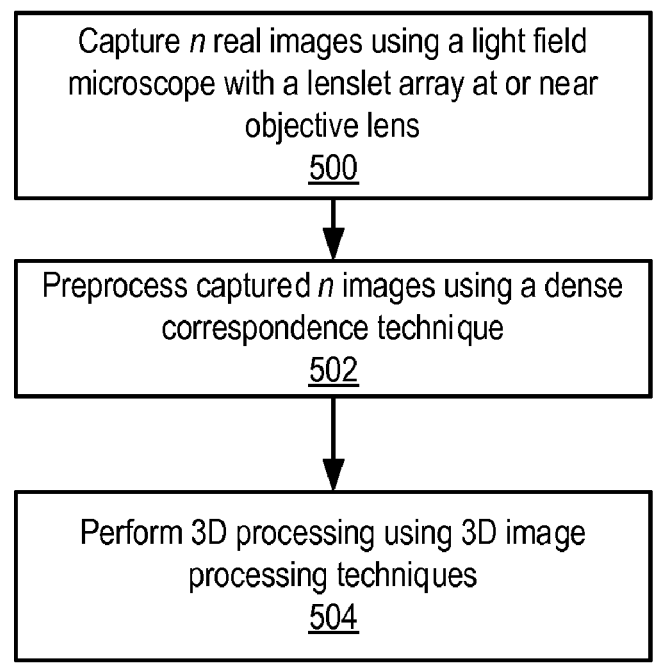
FIG. 8 illustrates a method of capturing and processing images using a light field microscope with a lenslet array at or near the objective lens, according to one embodiment.

Captured real images such as those shown in the example given by FIG. 7 may need to be pre-processed to generate the desired light field information. Using a microlens array as illustrated in FIG. 1 generates a set of images from each of which corresponding pixels are extracted and combined to produce "real" images. FIG. 8 illustrates a method of capturing and processing real images using a light field microscope with a lenslet array 210 at or near the objective lens, according to one embodiment. As indicated at 500, a light field microscope with a lenslet array 210 at or near the objective lens may be used to capture n (e.g., 100) real images (note that all of the n real images may be captured in a single image). Using embodiments of the lenslet array 210 as described herein, each image projected on and captured by the sensor is a real image of the specimen. The same object (specimen) appears in each real image, but no two of the n real images are identical. Angular information is captured in the relationships or differences among the n real images. As indicated at 502, to retrieve this angular information, one or more of various dense correspondence techniques, which may also be referred to as image registration techniques, may be used to establish correspondence between and among the features of the n real images projected by the lenslet array 210 onto the sensor, and captured by the sensor.

As indicated at 504, after dense correspondence of the n real images is performed, various computer-implemented image processing techniques, which may be implemented in software, hardware, or a combination thereof, and which may include techniques that are equivalent or similar to techniques used in conventional light field rendering, tomography, and confocal microscopy, may be used to further process the pre-processed image information.

Embodiments of a microscope including a lenslet array 210 as described herein may be used to generate a smaller number of higher-resolution real images, and software techniques may then be applied to the captured images to synthesize additional "in-between" images from the captured image information, each synthesized image corresponding to a different (synthesized) view of the specimen. For example, significantly less than 100 images may be captured in order to gain a higher spatial resolution. Generally, at least 100 images are needed to produce quality 3D imaging results. Therefore, additional images may be synthesized from the captured images using, for example, dense correspondence and view morphing techniques. For example, 20 real images may be captured. From those 20 real images, using dense correspondence and/or view morphing techniques, additional in-between images may be synthesized, for example 80 to 1000, or more, additional images may be synthesized. Refocusing, camera motion, view change, etc. may thus be performed. This allows 3D imaging techniques to be performed with fewer actually captured images by generating a sufficient number of additional synthesized images, while providing better image resolution on the sensor. Thus, better image resolution may be obtained with little if any loss of quality.

Exemplary System

Figure 9:
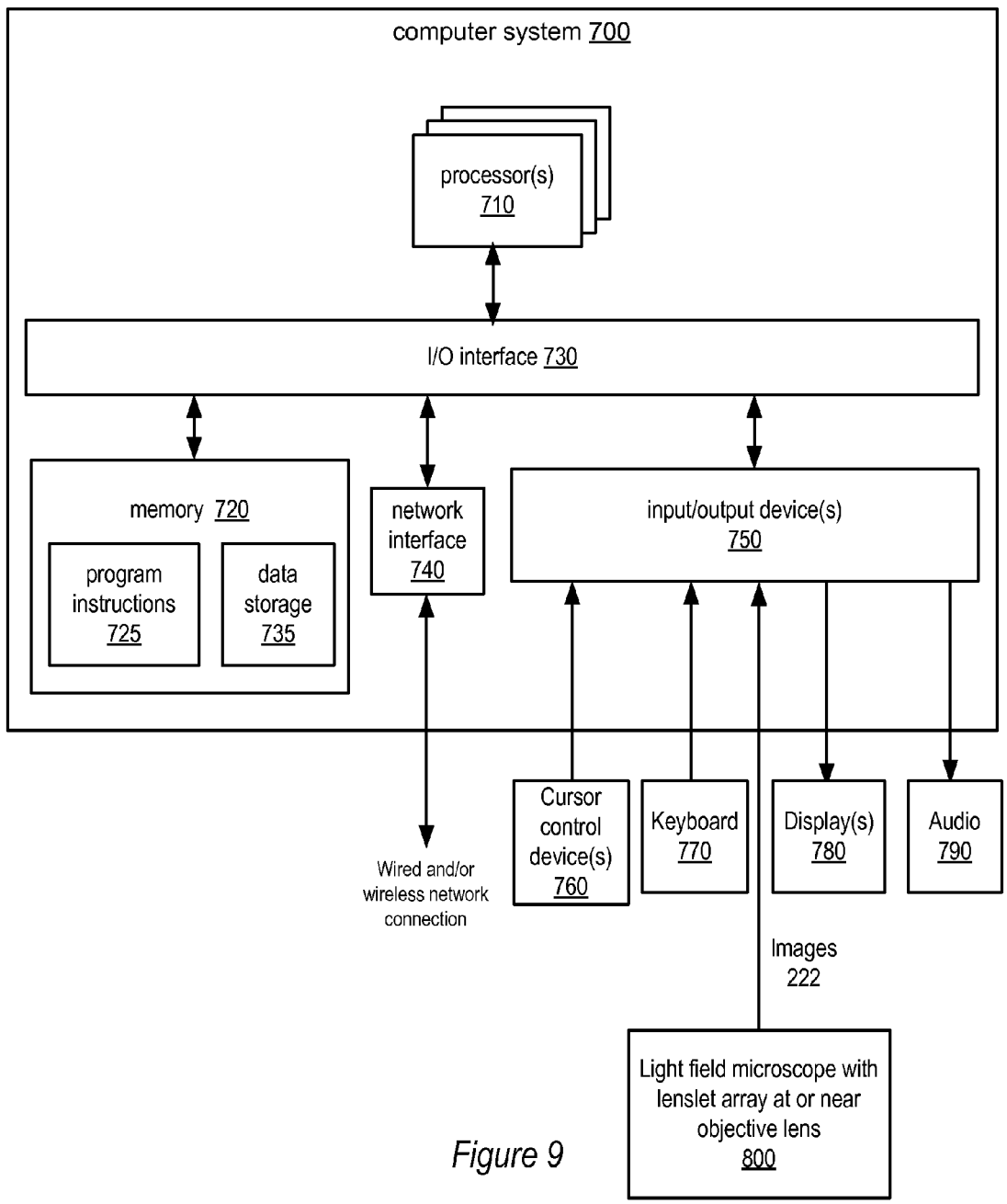
FIG. 9 illustrates an exemplary computer system that may be used in embodiments.

Various embodiments of software, including but not limited to dense correspondence software, for capturing and processing arrays of real images generated by a light field microscope 800 incorporating a lenslet array as described herein may be executed on one or more computer systems, which may interact with various other devices. One such computer system is illustrated by FIG. 9. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for capturing and processing arrays of real images captured using a light field microscope 800 incorporating a lenslet array, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may include input from a light field microscope 800 for receiving real images 222 captured by the light field microscope 800 using a lenslet array as described herein. Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 9, memory 720 may include program instructions 725, configured to implement software, including but not limited to dense correspondence software, for capturing and processing arrays of real images generated by a light field microscope 800 incorporating a lenslet array as described herein, and data storage 735, comprising various data accessible by program instructions 725. Data storage 735 may include data that may be used in some embodiments. In other embodiments, different software elements and data may be included.

Those skilled in the art will appreciate that computer system 700 is merely illustrative and is not intended to limit the scope of the light field microscope 800 incorporating a lenslet array as described herein. In particular, the computer system and devices may include any combination of hardware or software that can perform the indicated functions, including but not limited to computers, network devices, internet appliances, PDAs, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A light field microscope, comprising:
an objective lens;
a sensor at an image plane of the light field microscope configured to capture images projected onto the sensor; and
a lenslet array located at or near a rear aperture of the objective lens, wherein the lenslet array comprises a plurality of lenslets;
wherein each lenslet of the plurality of lenslets is configured to project a separate real image of a specimen under the objective lens onto a separate location on the sensor so that the plurality of lenslets is configured to project a plurality of separate real images of the specimen under the objective lens onto a plurality of separate locations on the sensor, wherein each separate real image corresponds to a different view of the specimen under the objective lens so that the plurality of separate real images correspond to different views of the specimen under the objective lens, and wherein angular information for an image of the specimen is recorded in differences among the plurality of separate real images.

2. The light field microscope as recited in claim 1, wherein each lenslet of the plurality of lenslets is a low power, long focal length optical lens.

3. The light field microscope as recited in claim 1, wherein the sensor is a charge-coupled device (CCD).

4. The light field microscope as recited in claim 1, wherein a focal length of each of the plurality of lenslets is greater than a focal length of the objective lens.

5. The light field microscope as recited in claim 1, wherein the lenslet array is integrated in the objective lens.

6. The light field microscope as recited in claim 5, wherein the lenslet array is located at or near a rear focal plane of the objective lens.

7. The light field microscope as recited in claim 1, wherein the light field microscope is an infinity-corrected microscope, and wherein the lenslet array is located at or near a tube lens of the light field microscope.

8. The light field microscope as recited in claim 1, wherein the light field microscope is an infinity-corrected microscope, and wherein the lenslet array replaces a tube lens of the light field microscope.

9. The light field microscope as recited in claim 1, wherein the sensor is configured to capture the plurality of separate real images projected onto the sensor by the plurality of lenslets.

10. The light field microscope as recited in claim 9, wherein the light field microscope is configured to provide the captured plurality of separate real images projected onto the sensor by the plurality of lenslets to a computer device comprising hardware, software or a combination of hardware and software executable on the computer device to generate angular information for an image of the specimen from differences among the captured plurality of separate real images in accordance with one or more dense correspondence techniques.

11. The light field microscope as recited in claim 9, wherein the light field microscope is configured to provide the captured plurality of separate real images projected onto the sensor by the plurality of lenslets to a computer device comprising hardware, software or a combination of hardware and software executable on the computer device to render one or more three-dimensional images of the specimen from the captured plurality of separate real images.

12. The light field microscope as recited in claim 9, wherein the light field microscope is configured to provide the captured plurality of separate real images projected onto the sensor by the plurality of lenslets to a computer device comprising hardware, software or a combination of hardware and software executable on the computer device to generate a plurality of synthetic images of the specimen from the captured plurality of separate real images in accordance with one or more dense correspondence techniques, wherein each of the plurality of synthetic images corresponds to a different synthetic view of the specimen under the objective lens.

13. The light field microscope as recited in claim 1, wherein each lenslet of the plurality of lenslets is corrected for aberrations.

14. A microscope objective lens, comprising:
an objective lens assembly comprising a plurality of lenses; and
a lenslet array integrated with the microscope objective lens at or near a rear focal plane of the microscope objective lens, wherein the lenslet array comprises a plurality of lenslets;
wherein each lenslet of the plurality of lenslets is configured to project a separate real image of a specimen under the microscope objective lens onto a separate location on a sensor located at an image plane of a light field microscope so that the plurality of lenslets is configured to project a plurality of separate real images of the specimen under the microscope objective lens onto a plurality of separate locations on the sensor, wherein each separate real image corresponds to a different view of the specimen under the microscope objective lens, and wherein angular information for an image of the specimen under the microscope objective lens is recorded in differences among the plurality of separate real images.

15. The microscope objective lens as recited in claim 14, wherein each lenslet of the plurality of lenslets is a low power, long focal length optical lens.

16. The microscope objective lens as recited in claim 14, wherein a focal length of each of the plurality of lenslets is greater than a focal length of the microscope objective lens.

17. The microscope objective lens as recited in claim 14, wherein each lenslet of the plurality of lenslets is corrected for aberrations.

18. A light field microscopy system, comprising:
a light field microscope, comprising:
an objective lens;
a sensor at an image plane of the light field microscope; and
a lenslet array located at or near a rear aperture of the objective lens, wherein the lenslet array comprises a plurality of lenslets;
wherein each lenslet of the plurality of lenslets is configured to project a separate real image of a specimen under the objective lens onto a separate location on the sensor, wherein each separate real image corresponds to a different view of the specimen under the objective lens; and
wherein the sensor is configured to capture the separate real images projected onto the sensor by the plurality of lenslets to generate a captured plurality of separate real images;
a computer device configured to couple to the light field microscope;
wherein the light field microscope is configured to provide the captured plurality of separate real images to the computer device; and
wherein the computer device comprises hardware, software or a combination of hardware and software executable on the computer device to generate angular information for an image of the specimen under the objective lens from differences among the captured plurality of separate real images.

19. The light field microscopy system as recited in claim 18, wherein the hardware, software or combination of hardware and software are further executable on the computer device to generate angular information for an image of the specimen under the objective lens from differences among the captured plurality of separate real images in accordance with one or more dense correspondence techniques.

20. The light field microscopy system as recited in claim 18, wherein each lenslet of the plurality of lenslets is a low power, long focal length optical lens.

21. The light field microscopy system as recited in claim 18, wherein a focal length of each of the plurality of lenslets is greater than a focal length of the objective lens.

22. The light field microscopy system as recited in claim 18, wherein the lenslet array is integrated in the objective lens.

23. The light field microscopy system as recited in claim 22, wherein the lenslet array is located at or near a rear focal plane of the objective lens.

24. The light field microscopy system as recited in claim 18, wherein the light field microscope is an infinity-corrected microscope, and wherein the lenslet array is located at or near a tube lens of the light field microscope.

25. The light field microscopy system as recited in claim 18, wherein the light field microscope is an infinity-corrected microscope, and wherein the lenslet array replaces a tube lens of the light field microscope.

26. The light field microscopy system as recited in claim 18, wherein the computer device further comprises hardware, software or a combination of hardware and software executable on the computer device to render one or more three-dimensional images of the specimen from the captured plurality of separate real images.

27. The light field microscopy system as recited in claim 18, wherein the hardware, software or combination of hardware and software are further executable on the computer device to generate a plurality of synthetic images of the specimen from the captured plurality of separate real images in accordance with one or more dense correspondence techniques, wherein each of the plurality of synthetic images corresponds to a different synthetic view of the specimen under the objective lens.

28. A method for generating a three-dimensional image of a specimen under an objective lens of a light field microscope, comprising:

projecting a separate real image of the specimen under the objective lens from each lenslet of a plurality of lenslets located at or near a rear aperture of the objective lens onto a separate location on a sensor located at an image plane of the microscope, wherein each separate real image corresponds to a different view of the specimen under the objective lens;

capturing the separate real images projected onto the sensor by the plurality of lenslets to generate a captured plurality of separate real images;

providing the captured plurality of separate real images to a computer device comprising software, hardware, or a combination of software and hardware implementing one or more dense correspondence techniques; and generating angular information for the three-dimensional image of the specimen from differences among the captured plurality of separate real images corresponding to the different views of the specimen in accordance with the one or more dense correspondence techniques.

29. The method as recited in claim 28, wherein each lenslet of the plurality of lenslets is a low power, long focal length optical lens.

30. The method as recited in claim 28, wherein focal length of each of the plurality of lenslets is greater than focal length of the objective lens.

31. The method as recited in claim 28, wherein the plurality of lenslets are integrated in the objective lens.

32. The method as recited in claim 28, further comprising generating a plurality of synthetic images of the specimen from the captured plurality of separate real images in accordance with the one or more dense correspondence techniques, wherein each of the plurality of synthetic images corresponds to a different synthetic view of the specimen under the objective lens.

33. A system, comprising:

at least one processor; and a memory comprising program instructions, wherein the program instructions are executable by the at least one processor to implement image processing software executable on the at least one processor to:

receive a plurality of separate real images of a specimen under an objective lens of a microscope, wherein the plurality of separate real images represent different views of the specimen under the objective lens projected onto a sensor located at an image plane of the microscope by a plurality of lenslets located at or near a rear aperture of the objective lens; and generate angular information for a three-dimensional image of the specimen from differences among the plurality of separate real images in accordance with one or more dense correspondence techniques.

34. The system as recited in claim 33, wherein the image processing software is further executable on the at least one processor to generate a plurality of synthetic images of the specimen from the plurality of separate real images in accordance with the one or more dense correspondence techniques, wherein each of the plurality of synthetic images corresponds to a different synthetic view of the specimen under the objective lens.

* * * * *